United States Patent [19]

Scott

[11] Patent Number: 4,706,091

[45] Date of Patent: Nov. 10, 1987

[54] COCKPIT TRANSMISSION ASSEMBLY

[76] Inventor: George M. Scott, 9494 SW. 144 St., Miami, Fla. 33176

[21] Appl. No.: 849,216

[22] Filed: Apr. 7, 1986

[51] Int. Cl.$^4$ ............................................. G01S 13/80
[52] U.S. Cl. ......................................... 342/42; 342/60
[58] Field of Search ..................... 342/33, 36, 42, 57, 342/60; 340/945; 455/99, 98

[56] References Cited

U.S. PATENT DOCUMENTS 3,931,622  1/1976  Freedman ..................... 342/60 X Primary Examiner—T. H. Tubbesing
Assistant Examiner—Mark Hellner
Attorney, Agent, or Firm—John Cyril Malloy

[57] ABSTRACT

An audio signal transmission system to be used on commercial airlines for the discrete transmission of voice conversations emanating from the cockpit of the aircraft automatically to a ground tracking station or a tracking aircraft in an emergency situation, sich as a hijacking, unbeknownst to occupants of the cockpit other than the crew members. The transmission system comprises an audio switching assembly which, when activated, transfers audio signals from a voice recorder assembly normally found on commercial aircraft to a radio transceiver of the aircraft for automatic transmission to ground tracking stations. Activation of the system can occur by a crew member carrying out his normal activities therefore not alerting hijackers when performing either one or both of the duties relating to setting the dual transponder control to a preselected code setting and/or the frequency channel selector of the radio transceiver to a preselected frequency.

19 Claims, 1 Drawing Figure

COCKPIT TRANSMISSION ASSEMBLY

BACKGROUND OF THE INVENTION

1. Field of the Invention

This invention relates to a system for transmitting conversation occurring within a cockpit of a commercial aircraft unbeknownst to unauthorized personnel within the aircraft, such as hijackers, directly to ground tracking stations and/or tracking aircraft and further alerting such ground tracking stations by preselecting a transponder code and/or a transmission frequency of the radio transceiver associated with the aircraft.

2. Description of the Prior Art

Voice recorder mechanisms commonly referred to as the "black box" are an integral and required instrumentation for all commercial aircraft particularly for aircraft intended for the transportation of passengers. Prior art cockpit voice or sound recorders of the type referred to is represented in the structure disclosed in U.S. Pat. No. 3,327,067 to Boniface. In the commercial aircraft industry, it is also recognized that the setting of the transponder to 7500 represents an emergency signalling that a hijacking is taking place. When such occurs, all tracking ground stations react accordingly and take appropriate action. The setting of the dual transponder control associated with aircraft instrumentation to this preselected transponder code can be done as part of the normal operating duties of the crew members and accordingly, is not readily discernible by any hijackers or unauthorized occupants within the cockpit.

However, to date the prior art does not include any transmission facility capable of being readily incorporated into the instrumentation of a commercial aircraft which allows the monitoring of the conversation of the crew members, as well as the hijackers or any occupants of the cockpit.

Based on past hijacking situations of commercial airliners, the crew members are invariably instructed to break off any communication with the ground tracking station other than specific instructions and/or information allowed by the hijackers. Accordingly, authorities on the ground frequently have a limited knowledge of the facts and circumstances surrounding the hijacking. A complete knowledge of the activities and intentions of the hijackers would of course greatly aid authorities in the proper treatment of a given hijacking or like emergency situation. This would be particularly true in situations where the conversations between the cockpit crew and the hijackers were relayed to the proper authorities without knowledge of such relay by the hijackers.

Accordingly, there is a need in the airline and commercial aircraft industry for a transmission system capable of discretely transmitting the sounds, particularly voices, emanating from within the cockpit and to transmit this audio information by means of the radio facilities associated with the aircraft or a supplementary radio transceiver facility, to ground tracking stations for the purpose of determining pertinent information concerning a given emergency situation, such as a hijacking, without knowledge of occupants of the cockpit other than the crew members. Activation of such a preferred transmission system can occur by actions of the crew members which would appear to be normal and required for the operation of the aircraft.

SUMMARY OF THE INVENTION

The present invention is directed towards a cockpit transmission system of the type which is capable of discretely transmitting sounds emanating from a cockpit, particularly voices and conversation occurring therein, to a ground tracking station. The subject transmission system is designed for emergency situations and primarily such emergency situtations involving hijacking wherein it would be highly advantageous to authorities at ground level to know certain facts concerning the actions and intentions of the hijackers such as number of hijackers involved, number and type of weapons, intended destination, etc. While the subject transmission system will be described primarily with regard to operation during emergency situations involving hijacking, it should be emphasized that the subject transmission system could further be activated in other emergency situations when it would be advantageous to automatically transmit all conversation within a cockpit to ground facilities for immediate evaluation or for recording and storage of such cockpit conversations in situations involving an airplane crash wherein the conventional cockpit sound or voice recorder would be difficult or impossible to retrieve.

It is further emphasized that while the subject invention will be described in terms of a preferred embodiment which utilizes instrumentation commonly found in commercial aircraft such as dual transponder facilities, VHF radio transceivers, and cockpit voice and sound recorders, one or all of such facilities when considered an integral part of the aircraft could be avoided and supplementary instrumentation could be included in an insertable instrumentation package rather than relying on the instruments presently in the aircraft. For example, if FAA regulations prevented the integration of the voice recorder assembly of the aircraft into the subject transmission system, an auxiliary microphone assembly could be incorporated in an instrumentation package which could be inserted and/or replaced in the cockpit or appropriate location in the aircraft.

The subject cockpit transmission system comprises instrumentation for transferring audio signals normally received by the voice and sound recorders associated with the aircraft directly to an integration means. The audio signals from the voice recorder facility is received at the audio integration means by means of a first audio monitor connection. A second audio monitor connection exists between the audio integration means and the audio switching assembly such that audio signals received from the voice recorder facility will be directed to the audio switching assembly. The audio switching assembly is accordingly structured to regulate transfer of audio signals directly to the radio transceiver means associated with the aircraft (or supplied as a supplementary instrument) and when so received, to be automatically transmitted to ground receiving stations tracking the aircraft.

However, the audio signals are not transferred directly to the radio transceiver means until the audio switching assembly is properly activated. Such activation occurs through operation of an activation means.

Activation of the audio switching assembly can occur through operation of either or both a first detection assembly associated with the transponder means of the aircraft and/or a second detection assembly associated with radio transceiver means. Generally, the first detection assembly associated with the transponder means is rendered into an operative mode when the dual transponder control is set to a preselected code number. It is well recognized in the airline industry that the code number 7500 is an alert indication that a hijacking is taking place. Accordingly, the first detection assembly associated with the transponder means could be preset so as to send an activating signal through its connection to the audio switching assembly when such identifying transponder code is set into the transponder means. It should be readily apparent that other preselected codes could be utilized other than the recognized hijacking code 7500.

Similarly, the second detection assembly is rendered into an operative mode by placing the frequency channel selector associated with the radio transceiver means to a preselected frequency such as 123.45 MHZ. The second detection assembly accordingly is structured so as to send an activating signal to the audio switching assembly only when the frequency channel selector is set at this preselected frequency, or any other frequency which has been predetermined.

The audio switching assembly accordingly serves as a regulating mechansim and is structured to be activated into a transferring mode only when activated by either the first detection assembly or the second detection assembly or both. The determination to activate the audio switching assembly by one or the other or both of the aforementioned detection assemblies can be made in advance and based on efficiency, safety, and overall operating characteristics of the instrumention. Once so activated, the audio switching assembly is structured to transfer the audio signals received by the audio integration means from the voice recorder to a preselected one of three VHF transceivers normally found in a commercial aircraft for automatic and discrete transmission to tracking ground stations.

The invention accordingly comprises the features of construction, combination of elements and arrangement of parts which will be exemplified in the constructions hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawing in which a single figure is presented in the form of a schematic representation of instrumentation components of the subject cockpit transmitter system.

DETAILED DESCRIPTION OF THE PREFERRED EMBODIMENT

Figure 1:
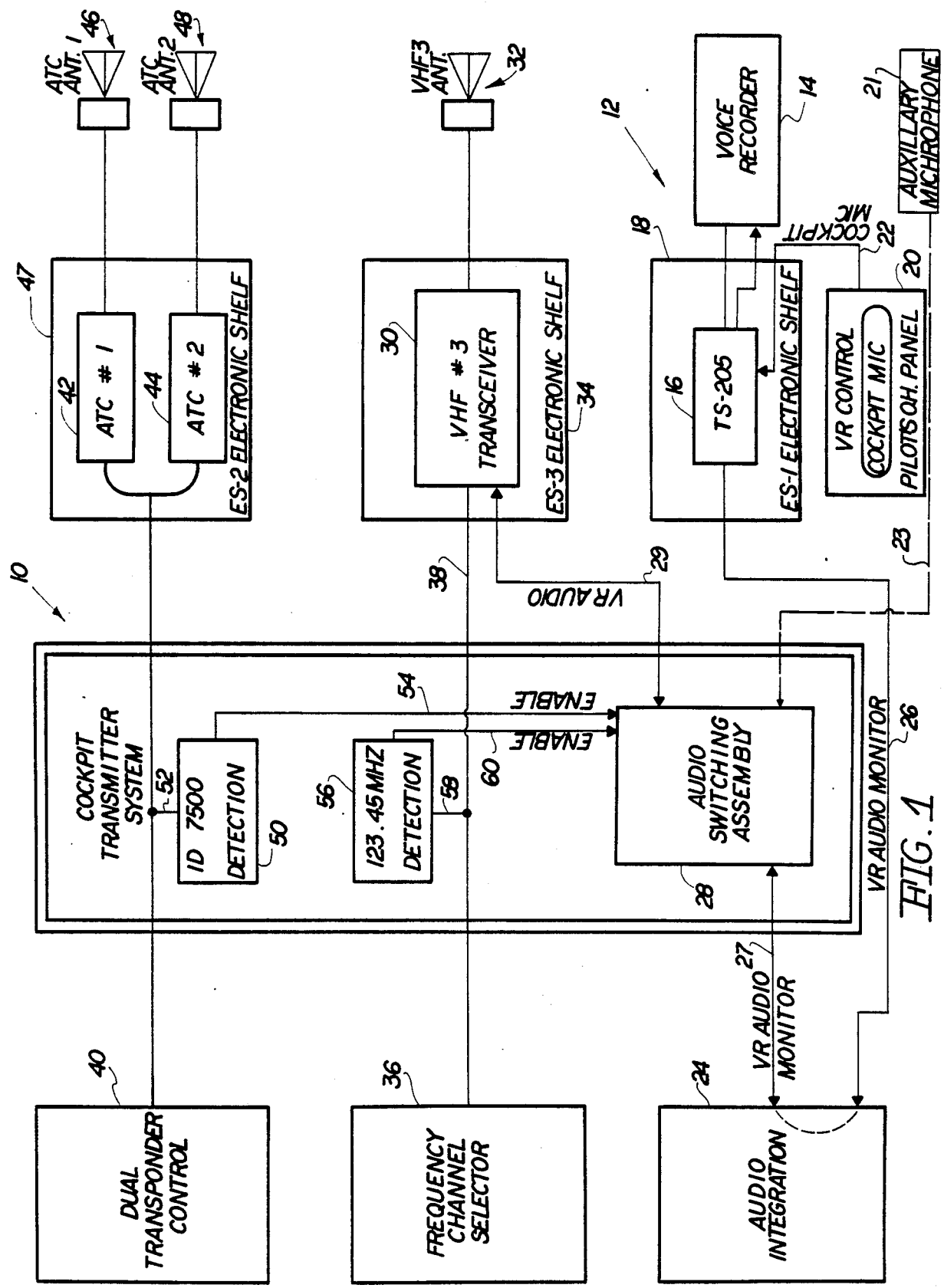

As shown in the single figure of the subject drawing, the cockpit transmitter system of the present invention is generally indicated as 10 and in the manner disclosed, is used in combination with instrumentation found in the typical commercial aircraft. Accordingly, in a preferred embodiment, the subject system is represened in combination with instrumentation found in a Boeing 727-235 commercial airliner. It should be readily apparent however that the subject system 10 could be adapted for use in combination with instrumentation of other aircraft. It is also to be emphasized at this point that supplementary instruments could be incorporated in an instrument package of the present invention thereby avoiding the use of a particular instrument which is part of the aircraft instrumentation. For example, if it was undesirable, because of FAA regulations or for other reasons not to use the conventional cockpit microphone 20 as input into voice recorder 12, an auxiliary microphone could be used as at 21. The auxiliary microphone could be incorporated in an instrument package as part of the subject transmitter system and avoid use of the cockpit microphone or voice recorder associated with the aircraft. Such substitution could also be used for other instrumention including the radio transceiver means.

In operation of the preferred embodiment, the voice and/or sound recorder means generally indicated as 12 includes a voice recorder facility 14 and a TS-205 package 16 associated therewith which is presented in an instrumentation package 18 located in a typical Boeing 727-235 aircraft on electronic shelf ES-1 in the cockpit. The voice recorder means 12 is connected to the cockpit microphone which also is associated with the voice recorder control and activated on the pilot's overhead panel collectively indicated as 20. Accordingly, in normal procedure, conversation between crew members in the cockpit can be recorded over the cockpit microphone and transmitted directly to the voice recorder facility 14 through the TS-205 package facility 16.

In addition to the above, the present invention contemplates the inclusion of an audio integration means 24 interconnected to the voice recorder means 22 by a first audio monitor connection 26 which allows transmission of audio signals received in the voice recorder means 12 from the cockpit microphone facility 20. A second audio monitor connection 27 is established between the audio integration means 24 and an audio switching assembly serving as a regulatory mechanism for the transfer of audio signals from the audio integration means 24, and originally from the voice recorder means 12 through microphone cockpit facility 20, to a radio transceiver means 30. In the preferred embodiment, the radio transceiver means may be one of three VHF transceivers which are part of the conventional instrumentation of the subject aircraft and indicated as 30. Placement and location of VHF #3 is located on electronic shelf, ES-3 in the cockpit and is used in combination with an independent VHF 3 antenna generally indiated as 32.

The structure of the audio switching assembly is such as to delay or block transfer of any audio signals from the audio integration means 24 received into the audio switching assembly 28 through audio monitor connection 27 unless the audio switching assembly 28 is properly activated.

Accordingly, the subject transmission system 10 comprises an activation means including a first detection assembly 50 and a second detection assembly 56 wherein, based on the operative features, as designed in the subject system, either or both of the first and/or second detection assemblies 50 and 56 respectively are placed in an operative mode to property activate the audio switching assembly 28.

The first detection assembly 50 works in combination with the transponder means of the aircraft (or supplementary instrumentation provided) including dual transponder control 40 and individual dual transponders ATC #1 indicated as 42 and ATC #2 indicated as 44, each operating off an independent antenna 46 and 48 respectively. Typically, ATC #1 and #2 are collectively packaged in the subject aircraft instrumentation and located on electronic shelf ES-2 wherein the collective package is designated as 47. The dual transponder control 40 is of course interconnected to regulate code input of ATC #1 and ATC #2. The first detection assembly 50 is interconnected by conductor 52 to the subject transponder means as shown and also is specifically structured to identify a specific and preselected transponder code such as transponder code 7500. In the aircraft and airline industry, this is a well recognized alert code indicating that a hijacking is in progress. However, it should be emphasized that any other transponder code could be utilized other than 7500. Once the preselected transponder code (7500) has been set by the dual transponder control, the first detection assembly 50 recognizes such preselected code and sends an activating signal by means of line 54 to the audio switching assembly 28. In addition or alternately, a second detection assembly 56 is interconnected into association with the radio transceiver means of the aircraft and in particular one of the three transceivers such as VHF #3 indicated as 30. The second detection assembly 56 is interconnected as at 58 such that selection of a specific, preselected frequency, such as 123.45 MHZ, input through frequency channel selector 36 will place the second detection assembly 56 in an operative mode. This is due to the structural configuration of the second detection assembly 56 being capable of identifying a specific and preselected frequency. Accordingly, an activating signal is sent from the second detection assembly 56 to the audio switching assembly by means of line 60 as shown.

While for purposes of safety, it may be advisable to require activation of auto switching assembly 28 only after receiving both activating signals from the first and second detection assemblies 50 and 56 respectively thereby preventing inadvertent activation of the audio switching assembly 28, such as when the frequency channel selector 40 inadvertently passes through 1.23.45 MHZ frequency or any other preselected frequency.

In addition, it is an important feature of the present invention that the first and second detection assemblies are placed in an operative mode by manipulation of the dual transponder control and frequency channel selector 40 and 36 respectively which is a part of the normal procedure or activities of a crew member in the operation of the aircraft. The audio switching assembly can be effectively activated in a discrete manner without raising the suspension of any present hijackers or other unauthorized personnel in the cockpit. Once activated, the audio switching assembly 28 ceases to block the transfer of the audio signals from the voice recorder means 12 through the audio integration means 24. Such audio signals are now transferred by means of line 29 directly to the designated VHF transceiver 30 and automatically broadcast to any ground tracking station.

By virtue of this system, all sounds, primarily conversation, emanating from the cockpit will be transmitted, discretely, to the tracking station without the knowledge of any unauthorized personnel in the cockpit.

It is therefore to be understood that the following claims are intended to cover all of the generic and specific features of the invention herein described, and all statements of the scope of the invention which as a matter of language, might be said to fall therebetween.

Now that the invention has been described,

What is claimed is:

1. In a transmission system of the type designed to discretely transmit conversation from a cockpit of an aircraft of the commercial type wherein the aircraft includes transponder means for identifying individual aircraft to ground tracking stations, radio transceiver means capable of transmitting audio signals to the ground stations and a voice recorder means for recording sound from a cockpit microphone of voices emanating from within the cockpit, an improvement comprising:
   (a) audio integration means interconnected to said voice recorder means and structured for receiving audio signals therefrom,
   (b) a first audio monitor connection between said voice recorder means and said audio integration means and structured to transmit audio signals received by said voice recorder means to said audio integration means,
   (c) an audio switching assembly interconnected to said audio integration means by a second audio monitor structure and to said radio transceiver means for the regulated transmission of audio signals thereto,
   (d) said audio switch assembly structured to regulate transfer of audio signals from said audio integration means to said radio transceiver means and accomplish such transfer of the audio signals upon activation of said audio switching assembly,
   (e) activation means interconnected between at least one of said transponder means or said radio transceiver means and said audio switching assembly for activation thereof, said activation means structured to signal said audio switching assembly upon assuming an operative mode, and
   (f) said audio switching assembly when activated by said activation means directs audio signals representative of all cockpit conversation received by said voice recorder means to said radio transceiver means for transmission of the received audio signals to a ground tracking station.

2. The improvement of claim 1 wherein said activation means comprises a transponder detection assembly interconnected between a transponder control of said transponder means and said audio switching assembly, said transponder detection assembly structured for activation upon its recognition of the setting of said transponder control to a preselected code number.

3. The improvement of claim 2 wherein said transponder detection assembly is cooperatively structured and interconnected with said audio switching assembly to activate said audio switching assembly upon setting of said transponder control to said preselected code number.

4. An assembly as in claim 1 wherein said activation means comprises a radio frequency detection assembly interconnected between a frequency channel selector of said radio transceiver means and said audio switching assembly, said radio frequency detection assembly being structured for activation upon its recognition of the setting of said frequency channel selector to a preselected frequency.

5. The improvement of claim 4 wherein said radio frequency detection assembly is cooperatively structured and interconnected to said audio switching assembly to activate said audio switching assembly upon setting of said frequency control selector to said preselected frequency.

6. The improvement of claim wherein said activation means comprises a first detection assembly interconnected to said transponder means and structured for recognition of a preselected transponder code setting of said transponder means and subsequent transmission of a first activating signal to said audio switching assembly, a second detection assembly interconnected to said radio transceiver means and structured for recognition of a preselected frequency setting of said radio transceiver means and subsequent transmission of a second activating signal to said audio switching assembly.

7. An improvement as in claim 6 wherein said audio switching assembly is cooperatively structured and interconnected with both said first detection assembly and said second detection assembly for activation of said audio switching assembly upon receipt of both said first activating signal and said second activating signal from said first detection assembly and said second detection assembly respectively.

8. The improvement of claim 7 wherein said audio switching assembly is further strutured to transfer audio signals to said radio transceiver means, from said voice recorder means through said audio integration means once said audio switching assembly is activated.

9. A cockpit transmission system of the type primarily designed to discretely transmit audio signals to ground or air tracking facilities, said system comprising:
  (a) transponder means including a transponder controlled for setting and transmitting a preselected transponder code,
  (b) radio transceiver means for transmitting audio signals to a ground tracking station,
  (c) a voice recorder means for receiving and recording sounds emanating from the cockpit,
  (d) audio integration means connected to said voice recorder means and receiving audio signals therefrom,
  (e) an audio switching assembly connected to said audio integration means to receive audio signals therefrom and further connected to said radio transceiver means to transfer audio signals received from said audio integration means thereto,
  (f) said audio switching assembly structured to regulate transfer of audio signals from said voice recorder means to said radio transceiver means and prohibit such transfer unless said audio switching assembly is activated,
  (g) activation means for sending at least one activating signal to said audio switching assembly for activation thereof,
  (h) said activation means structured to send said at least one activating signal upon placement thereof in an operative mode by a crew member of the cockpit, and
  (i) whereby activation of said audio switching assembly, when activated, directs audio signals representative of all cockpit conversation received by said voice recorder means to said radio transceiver means for transmission of the received audio signals to ground tracking facilities.

10. A system as in claim 9 wherein said activation means comprises a first detection assembly interconnected to said transponder means and structured for recognition of a preselected transponder code setting of said transponder means and subsequent transmission of a first activating signal to said audio switching assembly.

11. A system as in claim 10 wherein said audio switching assembly is cooperatively structured and interconnected with said first detection assembly for activation of said audio switching assembly upon receipt of said first activating signal therefrom.

12. A system as in claim 9 wherein said activation means comprises a second detection assembly interconnected to said radio transceiver means and structured for recognition of a preselected frequency setting of said radio transceiver means and subsequent transmission of a second activating signal to said audio switching assembly.

13. A system as in claim 12 wherein said audio switching assembly is cooperatively structured and interconnected with said second detection assembly for activation of said audio switching assembly upon receipt of said second activating signal from said second detection assembly.

14. A system as in claim 9 wherein said activation means comprises a first detection assembly interconnected to said transponder means and structured for recognition of a preselected transponder code setting of said transponder means and subsequent transmission of a first activating signal to said audio switching assembly, a second detection assembly interconnected to said radio transceiver means and structured for recognition of a preselected frequency setting of said radio transceiver means and subsequent transmission of a second activating signal to said audio switching assembly.

15. A system as in claim 14 wherein said audio switching assembly is cooperatively structured and interconnected with both said first detection assembly and said second detection assembly for activation of said audio switching assembly upon receipt of both said first activating signal and said second activating signal from said first detection assembly and said second detection assembly respectively.

16. A system as in claim 15 wherein said audio switching assembly is further structured to transfer audio signals to said radio transceiver means from said voice recorder means through said audio integration means once said audio switching assembly is activated.

17. A cockpit transmission system of the type primarily designed to discretely transmit audio signals to ground or air tracking facilities, said system comprising:
  (a) radio transceiver means for transmitting audio signals to a tracking station,
  (b) microphone means disposed and structured for the pickup of sounds occurring within the cockpit of the aircraft,
  (c) an audio switching assembly connected to said microphone means to receive audio signals therefrom and further connected to said radio transceiver means to transfer audio signals received from said microphone means,
  (d) said audio switching assembly structured to regulate transfer of audio signals from said microphone means to said radio transceiver means and prohibit such transfer unless said audio switching assembly is activated,
  (e) activation means for sending at least one activating signal to said audio switching assembly for activation thereof,
  (f) said activation means structured to send at least one activating signal upon placement thereof in an operative mode,
  (g) whereby activation of said audio switching assembly, when activated, directs audio signals representative of all cockpit conversation received by said microphone means to said radio transceiver means for transmission of the received audio signals to tracking facilities, and (h) said activation means comprising at least one detection assembly interconnected to said radio transceiver means and structured for recognition of a preselected frequency setting of said radio transceiver means and subsequent transmission of an activating signal to said audio switching assembly.

18. A system as in claim 18 wherein said audio switching assembly is cooperatively structured and interconnected with said one detection assembly for activation of said audio switching assembly upon receipt of said activating signal from said one detection assembly.

19. A system as in claim 17 further comprising a transponder means including a transponder controlled for setting and transmitting a preselected transponder code; said activation means comprising a first detection assembly interconnected to said transponder means and structured for recognition of a preselected transponder code setting of said transponder means and subsequent transmission of a first activating signal to said audio switching assembly, a second detection assembly interconnected to said radio transceiver means and structured for recognition of a preselected frequency setting of said radio transceiver means and subsequent transmission of a second activating signal to said audio switching assembly, said audio switching assembly being cooperatively structured and interconnected with both said first detection assembly and said second detection assembly for activation of said audio switching assembly upon receipt of both said first activating signal and said second activating signal from said first detection assembly and said second detection assembly respectively.

* * * * *